March 30, 1943.  J. R. BOYLE  2,315,185
AIR VELOCITY METER
Filed July 22, 1937   5 Sheets-Sheet 1

Inventor
John R. Boyle

Patented Mar. 30, 1943

2,315,185

UNITED STATES PATENT OFFICE 2,315,185

AIR VELOCITY METER

John R. Boyle, Chicago, Ill., assignor to Illinois Testing Laboratories, Inc., Chicago, Ill., a corporation of Illinois Application July 22, 1937, Serial No. 154,955

17 Claims. (Cl. 73—202)

The present invention relates to an air velocity meter.

One of the objects of the invention is to improve upon the construction of meter disclosed in my prior patent Reissue No. 21,127, reissued June 27, 1939.

Another object of the invention is to increase the range of utility of the meter by providing for the measurement of air velocities in locations and situations where it is impractical or impossible to introduce the meter directly into the air stream, or where the meter could not be read when so located, or where the presence of the meter in the air stream would cause such turbulence and blocking effects in the air stream as to result in an erroneous reading. Such conditions are frequently encountered in making velocity measurements in connection with air conditioning equipment, as, for example, where it is desired to measure air velocities in ducts and other closed conduits, or where it is desired to obtain accurate velocity measurements at different points across the face of a grille, or where it is desired to test for leaks at joints in a duct, etc. For making velocity measurements under these conditions, I provide the meter with improved extension conduit means comprising a flexible tube which is adapted for detachable coupling at one end to the meter and which is adapted to receive an attachment jet at its other end. By virtue of the flexibility of the extension conduit, the attachment jet can be disposed at any desired point in the air stream, and the meter held in the most convenient position for reading the indications on the dial. My improved meter apparatus can also be employed for measuring suction velocities by connecting the extension conduit to the outlet port of the meter instead of to the inlet port. When measuring velocities in ducts and the like, a double type of jet is preferably employed, such having connection with both the inlet and outlet ports of the meter through two flexible tubes.

Another object of the invention is to provide improved velocity measuring jets for use under different operating conditions.

Another object of the invention is to provide improved meter apparatus which can be employed for measuring pressure conditions as well as velocities. It is frequently desirable to know the pressure conditions in ducts, plenum chambers, pipes, etc., either in terms of static pressure, velocity pressure or total pressure (i. e., static pressure plus velocity pressure). This is accomplished in my improved meter apparatus by connecting the meter with the duct through an extension conduit in such manner as to cause an air stream to pass through the meter at a velocity proportional to the pressure to be measured. The meter, in responding to the velocity of this air stream, gives a direct reading in terms of pressure on a pressure indicating scale of the dial. Static pressures of either positive or negative value can be measured in this manner, the extension conduit being connected to the outlet port of the meter instead of to the inlet port when measuring pressures of negative value.

Another object of the invention is to provide improved jet attachments for measuring static pressures, velocity pressures and total pressures.

Another object of the invention is to provide the meter with an improved locking device which serves to lock the moving parts against motion while the meter is being transported, and which can also be employed to temporarily retain the indicating means in any indicating position to which it has been actuated by the air stream.

Other objects and advantages of the invention will appear from the following detailed description of certain preferred embodiments thereof. In the accompanying drawings illustrating such embodiments:

Figure 16A is a fragmentary sectional view of a modified form of the general type of jet attachment illustrated in Figure 16.

Figure 19 is a side elevational view of a jet attachment for measuring total pressures in ducts and the like.

Figures 1, 2, 3, 4, 5:
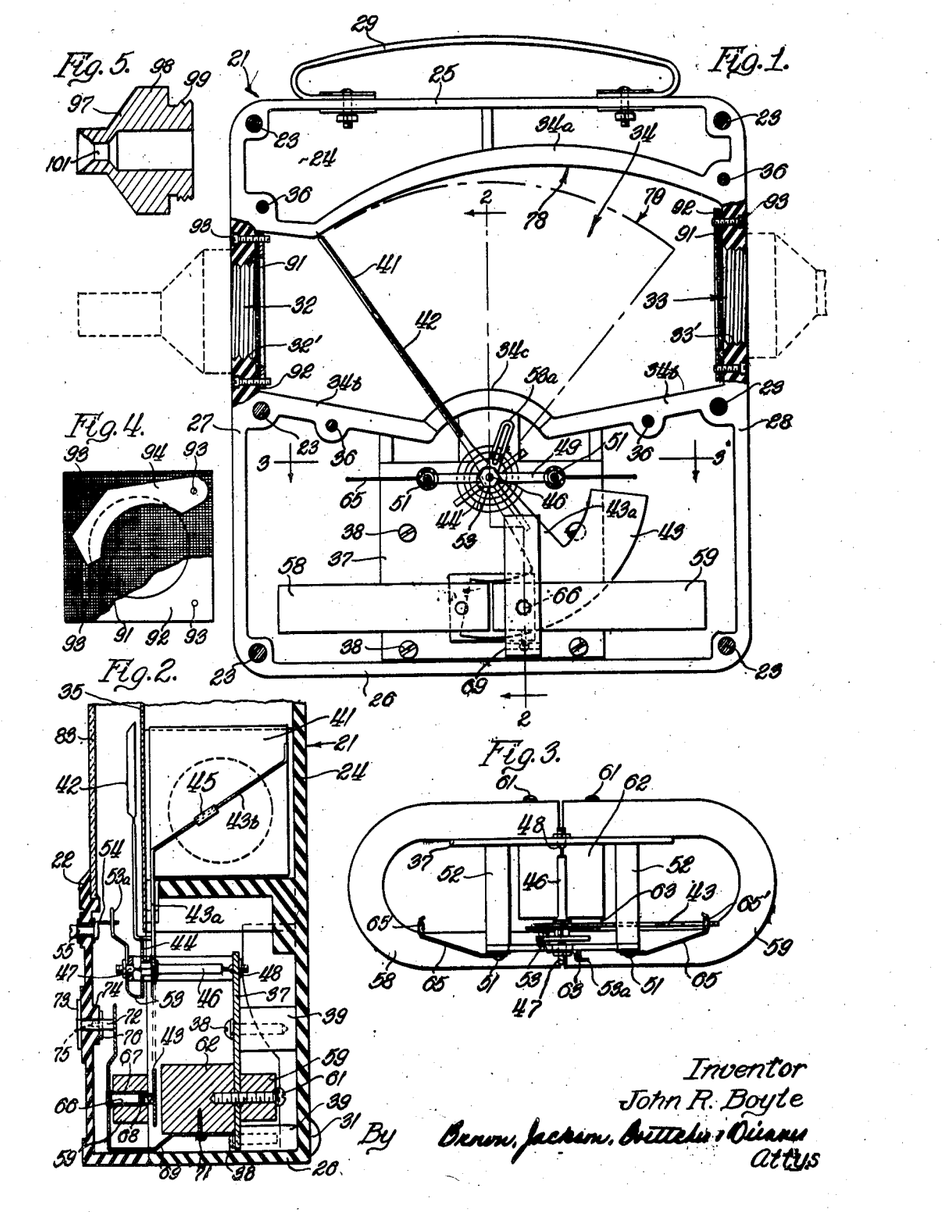
Figure 1 is a front view of the meter with the front cover removed, portions of the side walls being broken away to illustrate the inlet and outlet ports.
Figure 2 is a vertical transverse sectional view taken approximately on the plane of the line 2—2 of Figure 1.
Figure 3 is a horizontal sectional view taken approximately on the plane of the line 3—3 of Figure 1.
Figure 4 is a detail sectional view showing the calibrating shutter of the meter.
Figure 5 is an axial sectional view of an orifice fitting for the meter.

Referring first to Figures 1 and 2, the meter parts are enclosed within a housing comprising a main housing portion 21 and a removable front cover 22, both preferably composed of a molded plastic material. The cover 22 is secured to the main housing portion 21 by the screws 23 (Figure 1), the abutting surfaces of the main housing portion and of the cover being lapped, or a gasket being interposed therebetween, to form a pressure tight housing. The main housing portion comprises the back wall 24, the top and bottom walls 25 and 26 and the side walls 27 and 28. A suitable carrying strap 29 may be secured to the top wall 25, and rubber feet or pads 31 may be secured to the corners of the back wall for resting the meter on a supporting surface.

The inlet and outlet ports 32 and 33 are formed substantially opposite each other in the side walls 27 and 28. Extending between these ports is the air channel or passageway 34 in which the velocity responsive element of the meter oscillates. The top of the air channel 34 is defined by a curved top wall 34a, and the bottom of the channel is defined by sloping bottom wall portions 34b and a central arcuate wall portion 34c. The front side of the air channel is closed by a plate 35 which is secured to the main housing portion 21 by screws 36.

The movement is in the form of a rotatable device that is pivotally supported in its entirety on a supporting plate 37 which is secured in place by screws 38 extending through the plate and threading into tapped bosses 39 projecting forwardly from the back wall 24. The movement or rotatable device comprises the impact vane 41, pointer 42, damping segment 43 and hair spring 44. The damping segment 43, which is preferably constructed of aluminum, has an upwardly extending arm 43a comprising a diagonally bent upper portion 43b, to which the vane 41 is secured. The front edge of the arcuate bottom portion 34c of the air channel is recessed back from the plane of the dial plate 35 to provide an arcuate space through which the arm 43a extends up into the air channel. For minimum weight, the vane is preferably composed of a thin aluminum sheet, the edges of which are flanged for stiffening the sheet. For measuring the velocity or pressure of acid laden air, the vane may be composed of an acid resisting metal such as chromium, or may be plated with such a metal, or may have a protective coating of a phenol condensation product or the like sprayed thereon. The movement is supported on a transverse spindle 46 to which the arm 43a is fixedly secured. The ends of said spindle are journaled in bearings 47 and 48, which are preferably of a jewel type, the front bearing 47 being mounted in a front supporting bar 49, and the rear bearing 48 being mounted in the supporting plate 37. The front supporting bar 49 is secured by screws 51 to the front ends of two supporting posts 52 projecting forwardly from the upper portion of the plate 37. The pointer 42 is secured to the arm 43a and extends upwardly in front of the dial plate 35. The damping segment 43 substantially balances the weight of the vane 41 and pointer 42 so that the meter can be held vertically, horizontally, or in any intermediate angular position without disturbing the accuracy of the reading. A balancing clip 45 is shiftably mounted on the diagonally bent portion 43b of the arm 43a, the shifting of said clip providing for minute balancing adjustments of the vane. The hair spring 44 has its inner end secured to the spindle 46 and its outer end secured to the lower end of an arm 53 which is rotatably supported on the front bearing screw 47. The upper portion of said arm is slotted, as indicated at 53a, for receiving a pin 54 (Figure 2). Said pin is secured to an adjusting stud 55 which is rotatably mounted in the cover plate 22, the stud having a snug fit in the cover plate to prevent leakage of air from the housing. The pin 54 is eccentrically secured to the stud 55, whereby rotation of the stud operates through the pin 54 to swing the arm 53. In this manner, rotation of the stud 55 from the exterior of the housing is operative to increase or decrease the tension of the hair spring 44 for adjusting the zero position of the pointer 42.

Magnetic damping retardation is imposed on the damping segment 43 by two U-shaped permanent magnets 58 and 59 which are mounted in the lower portion of the housing. The rear legs of the two magnets are secured to the supporting plate 37 by screws 61 which extend through the plate 37 and thread into a block 62 projecting forwardly from the front side of the plate 37, the magnets and block being thereby clamped to the plate 37. The block 62 is of a magnetic metal and constitutes a part of the magnetic circuit. As shown in Figure 3, the front surface of this block is spaced from the front legs of the two permanent magnets to define an air gap 63 therebetween, and the damping segment 43 is adapted to swing through this air gap. The magnets are mounted in opposed relation with opposite poles juxtaposed, and hence the flux of both magnets traverses the air gap 63. The magnetic damping action of this flux on the damping segment 43 prevents objectionable oscillation or fluttering of the indicating pointer 42 when reading rapidly pulsating air currents. The indication established by the pointer 42 in the case of a rapidly pulsating air flow is substantially the mean of the different velocities; although the pointer is capable of following such slow surges or changes in velocity as can be read directly without inconvenience. The magnetic damping action facilitates the use of the jet attachments to be hereinafter described, as is particularly illustrated when these jet attachments are moved across the face of a grille or the like for taking average readings of the discharge from said grille. The magnetic damping action prevents objectionable fluttering of the pointer in response to eddy current fluctuations in such a discharge. The magnetic damping action also cooperates with the portable characteristic of the meter, in that movement of the meter while being held in the hand during a reading does not cause objectionable motion of the pointer. The limits of throw of the vane 41 in each direction are defined by resilient spring clips 65 which are anchored to the outer ends of the posts 52 by the screws 51. As shown in Figure 3, the rearwardly bent outer ends of these spring clips have small sleeves 65' rotatably mounted thereon, and such portions of the clips lie in the path of movement of the ends of the damping segment 43 so as to resiliently limit the throw of said segment.

Referring now to the locking apparatus which serves to lock the moving system against motion while the meter is being transported, it will be seen from Figures 1 and 2 that a detent pin 66 reciprocably mounted in a bore 67 in the front leg of the magnet 59 is operable to engage the front surface of the damping segment 43 when said pin is thrust inwardly in said bore. The inner end of the pin 66 carries a rubber tip 68 which can apply adequate friction pressure against the side of the damping segment 43 to lock the moving system against motion, but without bending the damping segment or forcing it laterally into contact with the block 62. The outer end of the pin 66 is anchored in a resilient sheet metal clip 69 which has one end secured to the underside of the block 62 by a screw 71. The upwardly extending leg of the clip 69 is adapted to be actuated by the shank 72 of a plunger button 73 which is reciprocably and rotatably mounted in the front cover 22, the shank 72 having a snug fit in the cover to prevent leakage of air from the housing. A boss 74 projecting rearwardly from the cover has diametrically opposite recesses 75 formed therein, and cooperating therewith is a cross pin 76 extending through the shank 72. When the ends of said cross pin 76 are engaging in the recesses 75 the vane and pointer are free to oscillate. Pressing the plunger button inwardly locks the vane and pointer against motion, and rotation of the plunger button to dispose the ends of the cross pin on the solid portion of the boss 74 retains such locked condition.

Figures 6, 7, 8, 9, 10, 11, 12, 13:
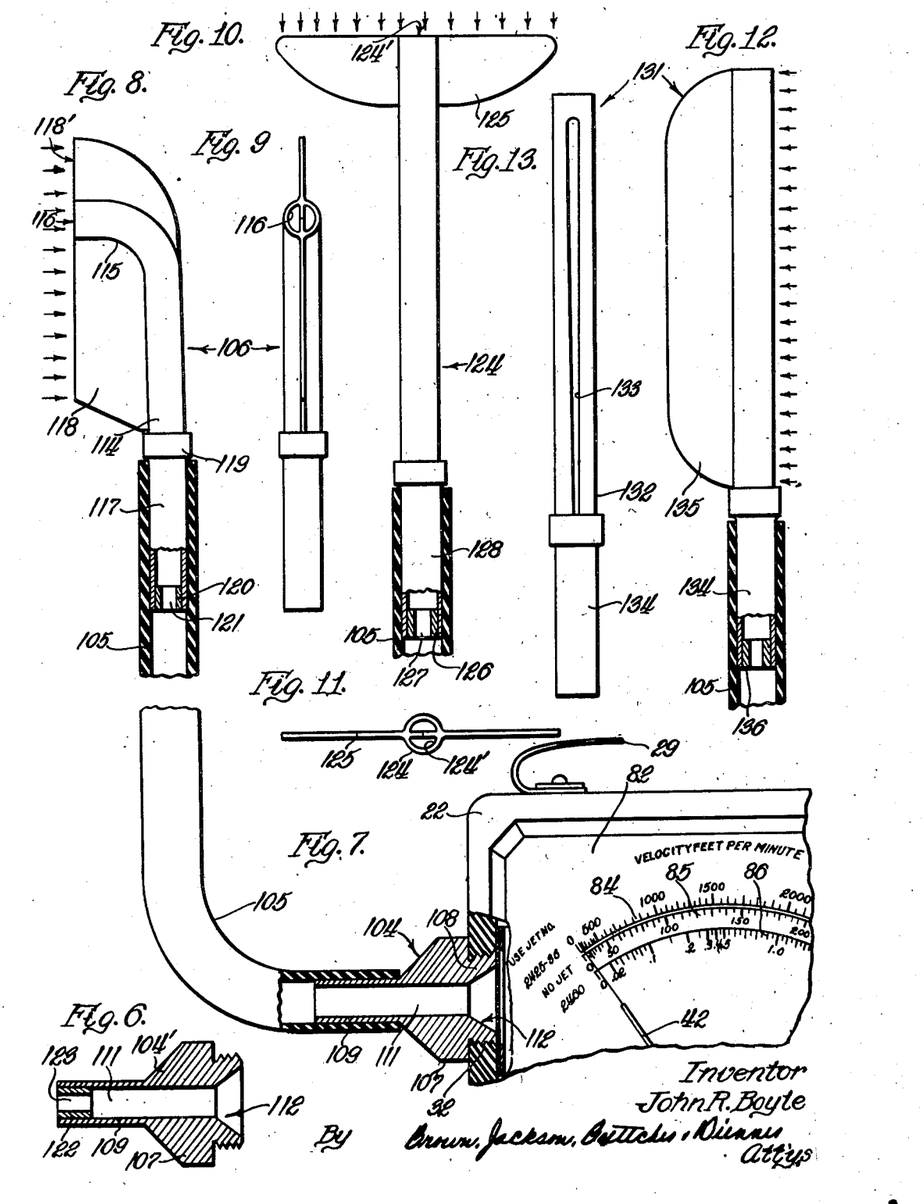
Figure 6 is a similar view of a calibrated coupling attachment for the meter.
Figure 7 is a fragmentary view, partly in section, showing the extension conduit connected to the meter.
Figures 8 and 9 are side and front elevational views, respectively, showing one type of velocity measuring jet attachment for connection with the meter.
Figures 10 and 11 are side and end views, respectively, of another type of velocity measuring jet attachment.
Figures 12 and 13 are side and front views of an "averaging" type of velocity measuring jet.

When the vane is in its zero position, as indicated in Figure 1, the upper edge thereof is in immediate proximity to the undersurface of the top wall 34a of the air channel 34. This undersurface is formed on a curve 78, which separates from the arc 79 designating the path of movement of the upper edge of the vane. The curve 78 may be a true arc, or may be a parabola or other generated curve, depending principally on the manner in which it is desired to subdivide the indicating scale on the instrument. With the scale graduated as shown in Figure 7, I preferably form the curve 78 as a true arc. The arcuate portion 34c of the bottom wall is preferably formed concentric with respect to the spindle 46 so that the small mechanical clearance between this wall portion and the lower edge of the vane remains constant in the movement of the vane. The side edges of the vane or movable element 41 are disposed in close proximity to the front and side walls of the air channel 34, so that the vane closes the major portion of said channel, particularly when in zero position.

The indicating arrangement preferably employs a moving pointer 42 and a stationary dial card 82, although this arrangement might be reversed to have the dial card movable and the pointer stationary, as shown in later described embodiments.

In the arrangement illustrated, the dial card 82 is secured to the front surface of the dial plate 35, the dial card and pointer 42 being visible through a glass window 83 provided in the front cover portion 22. As shown in Figure 7, the dial is provided with a plurality of scales 84, 85 and 86 which are calibrated for use of the meter both without jet attachments and with different types of jet attachments.

The inlet and outlet ports 32 and 33 are each provided with screw threads 32' and 33' adapted to have coupling attachments and orifice attachments screwed into the latter, as I shall presently describe. Mounted at the inner end of each port is a wire screen 91 which prevents the entrance of extraneous objects into the air channel. These wire screens are held in place by apertured plates 92 which are fastened by screws 93 to the housing. For basically calibrating the meter, the outlet port 33 is provided with a shutter 94 in the form of a thin segmental plate (Figure 4) which is pivotally supported on one of the screws 93 and is adapted to be moved to different positions for obstructing a greater or lesser area of the outlet port 33. The calibrating shutter is disposed between the screen 93 and the adjacent side wall of the housing, and after the meter has been calibrated by the proper positioning of said shutter the latter is rigidly clamped in this position by tightening the screws 93. If desired, such calibrating shutter may be associated with the inlet port instead of the outlet port, or a shutter might be associated with each port.

For measuring the velocities of air currents in rooms or large spaces, or at unrestricted outlets of ducts, etc., the meter can be held directly in the air stream, with the inlet and the outlet ports 32 and 33 aligned with the stream. In such use of the meter, there is frequent occasion to measure extremely low velocities, requiring great sensitivity of operation. The substantially straight line flow through the meter, from the inlet port 32 at one side thereof to the outlet port 33 at the other side thereof, increases the sensitivity and accuracy of the meter for this use, as described in detail in my prior patent Reissue No. 21,127. Furthermore, in such use of the meter, the fact that the vane or movable element 41 is substantially balanced for accurate operation in any plane enables the meter to be held vertically, horizontally, or at any intermediate angle for measuring the velocity of an air stream flowing in any direction. Such is of decided advantage for enabling one to determine accurately the angle or direction of a low velocity air current by merely comparing readings with the instrument held at different angles.

When disposing the meter directly in an air stream which is of relatively low velocity, the total effective area of the inlet port 32 may be left open for the entrance of such air stream. One of the scales on the dial 82 may be calibrated for this direct use of the meter when both ports are unrestricted, or a correction factor may be applied to a basic scale on the dial. For adapting the meter to higher velocities exceeding such scale range, an orifice fitting 97 is screwed into one or the other of the ports 32 or 33. As shown in Figure 5, this orifice fitting has a knurled body portion 98 from which extends a threaded shank 99 adapted to screw into the thread of the inlet or outlet port. A calibrated restriction 101 in said orifice attachment, restricts the amount of such high velocity air stream passing through the meter. One of the scales on the dial 82 may be calibrated for use with this orifice attachment, or a correction factor may be applied to one of the basic scales of the dial.

The orifice attachment 97 may be threaded into the inlet port 32 or into the outlet port 33, depending upon whether discharge or suction velocities are to be measured.

In Figures 7 and 8, I have shown the meter provided with the improved extension conduit apparatus for adapting the meter to the measurement of velocities at points removed from the instrument. This apparatus comprises the coupling 104, flexible tube 105 and jet attachment 106. The coupling attachment 104 comprises a knurled body portion 107 having a threaded shank 108 projecting from one end thereof for screwing into the port of the meter, and having a reduced extension 109 projecting from the other end thereof for receiving the end of the flexible tube 105. The bore 111 of the coupling is formed with a diverging taper 112 at its inner end, such taper causing the air stream to diminish in velocity and to increase in static pressure for filling the channel and producing a more uniform distribution of pressure over the vane 41. The flexible tube 105, which is preferably composed of rubber, has a push fit over the neck portion 109 of the coupling.

The jet attachment 106 comprises a length of tubing 114 having its outer end curved at 115 to dispose the jet opening 116 at right angles to the shank portion of the jet. The lower stem or coupling portion 117, extending below the collar 119, is adapted to be inserted into the end of the flexible tube 105. A thin guide vane or fin 118 extends axially of the tube 114, as best illustrated in Figure 9. The vane is preferably secured to the tube by cutting a slot in the curved portion 115 of the tube and soldering or otherwise fastening the vane in this slot. This type of jet attachment is of particular utility for exploring the velocities passing through irregularly shaped grilles, for detecting leaks in duct systems, and for measuring velocities through high velocity slotted grilles. By disposing the guide vane 118 in a plane parallel to the air movement, the jet opening 116 is properly disposed for giving an accurate reading at the instrument. The straight edge 118' along the front of the vane also insures that the jet opening 116 will be properly disposed with respect to the air stream when this straight edge is pressed up against the surface of a grille or the like. In the event that it is desired to measure a suction velocity with the jet attachment 106, the coupling 104 is threaded into the outlet port 33 of the meter. The jet attachment 106 may be individually calibrated by the provision of a bushing 120 fixedly secured in the neck portion 117, such bushing having a calibrated aperture 121 therein.

As an alternative practice, the calibration may be made in the coupling device which screws into the meter port. In Figure 6, I have illustrated such a calibrated coupling device 104' having a bushing or sleeve 122 fixedly secured in the end of the neck portion 109, said sleeve or bushing having a calibrated orifice 123. This orifice may establish a calibration which is individual to the jet attachment 106, or it may afford a master calibration for a series of jet attachments. Any of the jet attachments hereinafter described may have their calibration provided for by the use of such a calibrated coupling device.

Figures 10 and 11 illustrate a straight type of velocity jet 124 having its jet orifice 124' in the end thereof. This jet attachment also has a guide vane 125 intersecting the upper portion of the tube axially, as illustrated in Figure 11. A bushing or plug 126 having a calibrated orifice 127 is shown as being fixedly secured in the lower end of the neck portion 128 for individually calibrating the jet attachment such being the preferred practice, although the calibration might be obtained by the use of a calibrated coupling 104', as illustrated in Figure 6.

In Figures 12 and 13, I have illustrated an "averaging" jet attachment 131. The object of this jet is to take the average or mean velocity over an area corresponding to the effective length of the jet. This jet comprises a straight tube 132 having a longitudinal slot 133 opening into the bore of the tube. As shown in Figure 13, the slot 133 is tapered to be of greater width at that end which is remote from the stem portion 134 communicating with the flexible tube 105. A guide vane 135 projects from the back of the tube 132, diametrically opposite the slot, for indicating the proper positioning of the slot in the air stream. The jet is calibrated by a calibrating bushing 136 secured in the lower end of the stem portion 132. The taper of the slot 133 is proportioned to compensate for friction losses within the slotted length of the tube, so that a particle of air entering the slot from any one point in the air stream will have a kinetic energy at the meter which is directly proportional to the velocity at that point in the air stream, irrespective of whether such particle of air enters the outer end or the inner end of the tapered slot. Hence, the reading established at the meter is an average of all of the velocities of the span covered by the slot 133. When the jet is rotated, the meter gives the average velocity over the circle or area swept by the jet in such rotation. This type of jet is of particular value in commercial work for measuring the velocities at ordinary ducts or grilles, where it is satisfactory to ignore the eddy currents and dead spots set up by the bars in the grille and to take average readings over relatively large size circle areas.

Figures 14, 15, 16, 17, 17A, 18:
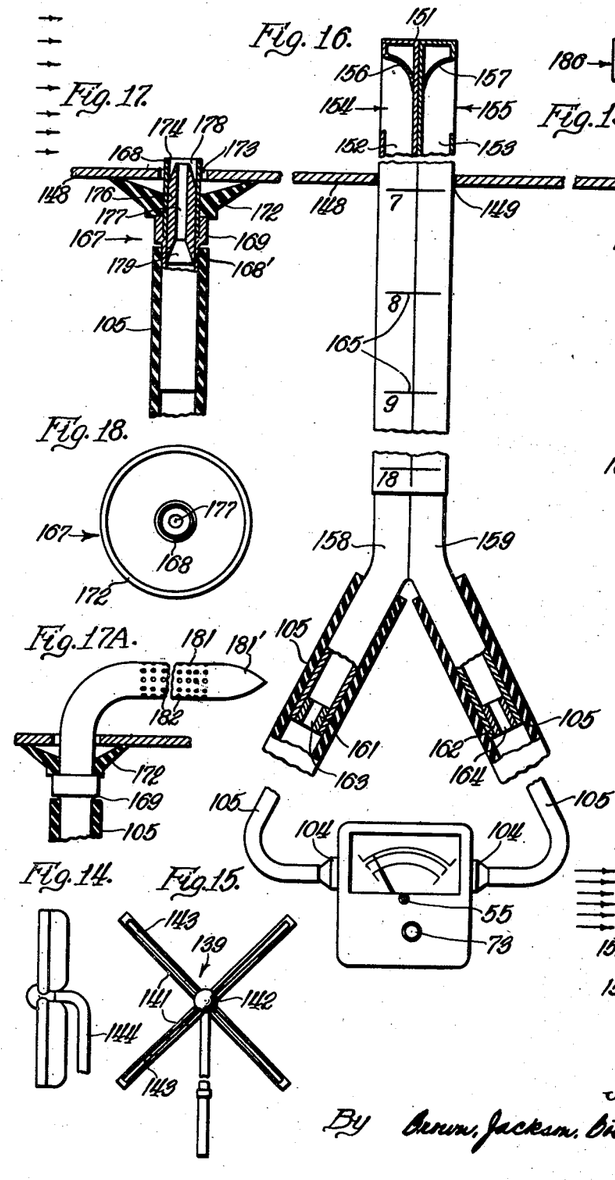
Figures 14 and 15 are similar views of another type of averaging jet.
Figure 16 is a plan view, partly in section, of a jet attachment for measuring velocities in ducts and the like, the connection thereof to the meter being illustrated in reduced scale in the lower portion of the figure.
Figures 17 and 18 are axial sectional and end elevational views, respectively, of a jet attachment for measuring static pressures.
Figure 17A is a fragmentary view of another form of jet attachment for measuring static pressures.

Figures 14 and 15 diagrammatically illustrate on a smaller scale another type of averaging jet attachment 139. This construction comprises a plurality of tubular arms 141, preferably four in number, radiating from a central hub 142. The forward face of each of said arms has a tapered slot 143 therein, the taper of such slots serving the same purpose as described in the preceding embodiment. The stem 144 of this jet extends downwardly from the hub portion 142 for connection with the flexible tube 105. A suitable calibrated bushing is secured in this stem portion, as described of the preceding embodiment.

It will be seen from the foregoing that any one of the velocity jet attachments illustrated in Figures 8 to 15 inclusive can be readily connected with the meter by merely screwing the coupling 104 into the inlet port of the meter, slipping the rubber tube 105 over the end of this coupling, and inserting the appropriate jet attachment into the other end of this rubber tube. In the event that it is desired to measure a suction velocity, the coupling 104 is screwed into the outlet port 33 at the other side of the meter. The flexibility of the rubber tube 105 enables the jet attachment to be inserted and maneuvered into positions difficult of access, and to be moved over extensive areas, while still holding the meter in a convenient position for reading the velocities. Any one of the previously described jets may be made of a greater over-all length for checking discharge or suction velocities of large ducts, or exploring air conditions at or near ceilings or other locations difficult to reach.

In Figure 16, I have illustrated jet apparatus for taking air velocity readings directly within ducts and the like. The wall of such a duct is indicated at 148, the latter being provided with an opening 149 therein through which the jet device can be inserted, this opening being capped or plugged when not in use. In the construction illustrated, the jet device 151 comprises two tubes 152 and 153 of square or oblong cross section, which are soldered or otherwise rigidly secured together back to back to form parallel air passageways. In the construction illustrated, the outer ends of the two tubes 152 and 153 are provided with oppositely facing openings 154 and 155 which are adapted to be disposed substantially at right angles to the air stream. These openings 154 and 155 are of relatively large size, each having an area which is at least as large or larger than the effective area of the passageway extending down its respective tube 152, 153. Curved surfaces 156 and 157 extend from the inner walls of the tubes to the outer edges of the openings 154 and 155 for providing a smooth flow through these openings. Tubes 158 and 159, of circular cross section, have their upper ends soldered or otherwise secured within the ends of the tubes 152 and 153, and have their lower ends laterally divergent so as to form coupling extensions for receiving the ends of the two rubber tubes 105. Secured within the lower ends of the tubes 158 and 159 are bushings 161 and 162 having calibrating orifices 163 and 164. Inscribed on the top surface of the jet 151 are graduations 165 spaced in inches or other units of length and numbered to indicate distances measured from the approximate center of the openings 154 and 155. These markings are of utility when it is desired to determine the velocity exactly in the center of the duct or at different distances from the side walls of the duct. As shown in reduced proportions at the lower end of Figure 16, the flexible tubes 105, 105 are both connected with coupling members 104, 104 which are threaded into the inlet and outlet ports 32 and 33 of the meter. It will thus be seen that the jet 151 constitutes a Pitot tube which serves to conduct air from the inlet opening 154 down through the by-pass circuit established by the meter and back up to the outlet opening 155. By reason of the fact that the velocity jet and the meter establish a circuit which is substantially closed to atmosphere, this apparatus can be employed for measuring velocities in ducts where the static pressure within the duct may be either above or below atmospheric pressure. The flexibility of the rubber tubes 105, 105 enable the meter to be held in any convenient position for reading while the jet is being moved inwardly or outwardly to different positions in the ducts. If desired, the jet can be calibrated at the meter by the use of a calibrated coupling member or members 104' threading into one or both ports of the meter.

In Figure 16A, I have shown a modification of the general type of velocity jet illustrated in Figure 16. In this construction, the tube 153 has no lateral opening 155 but instead has communication with the interior of the duct through a plurality of static pressure orifices 165 which are disposed at right angles to the direction of flow within the duct. These orifices preferably consist of a large number of small holes having a relatively large aggregate capacity for accommodating the necessary flow through the meter. The lateral opening 154 of the other tube 152 is faced against the air stream for measuring total pressure, i. e., velocity pressure plus static pressure. Thus, when using this jet attachment, the flow created through the meter is in proportion to the total pressure minus the static pressure, and the meter is calibated to read in velocity. The divergent lower coupling portion of this jet attachment may have calibrating bushings 161 and 162 therein, as illustrated in Figure 16.

All of the velocity jet attachments illustrated in Figures 8 to 16A inclusive are preferably calibrated so that the velocity measurements of these jets can be read on a single scale of the meter dial 82, such as the scale 84. This facilitates the use of a plurailty of jet attachments, although it will be understood that, if desired, separate scales may be provided for one or more of these velocity jets.

In Figures 17 and 18, I have illustrated a jet attachment 167 for measuring the static pressure within a duct, plenum chamber, pipe or the like. This jet comprises a tube 168 having a collar 169 secured thereto. The section of the tube 168' below the collar, which may be integral with the upper section 168 or a separate extension thereof, serves as the stem or coupling portion for receiving the end of the rubber tube 105. Engaging over the other end of the tube, and abutting the collar 169, is a sealing member 172, preferably in the form of a rubber cup. This end of the tube is adapted to be inserted through an opening 173 in the wall 148 of the duct, plenum chamber, etc. When the jet tube is inserted in the opening 173 and the jet pressed inwardly to firmly seat the rubber cup 172 against the wall 148, such cup effectively seals the opening 173 from communicating with atmosphere around the jet tube. The parts are so proportioned that in such position of the device, the opening 174 at the inner end of the jet tube projects inwardly beyond the inner surface of the wall 148. This locates the opening 174 at a point disposed inwardly of any burr which may project inwardly from the wall 148 as a result of cutting the hole 173. Where a flow prevails within the enclosure 148, I have found that the presence of such a burr may introduce very objectionable errors in static pressure readings unless the jet opening 174 is disposed beyond the zone of influence of such burr. Where a flow prevails in the enclosure 148, it is important that the inner end of the jet tube be disposed at right angles to such flow, and this is assured by the rubber cup 172 which holds the jet tube at right angles to the wall 148.

Fixedly secured within the tube 168 is a bushing or nozzle member 176 which has a calibrated bore 177 extending therethrough. The inner end of this bushing is formed with a conical extremity, whereby a space 178 is defined between the ends of the tube and bushing and surrounding the conical extremity of the bushing. Such space serves to overcome or nullify eddy currents at this end of the jet device, thereby increasing the accuracy of the static pressure measurements. For example, the trailing edge portion of the outer tube 168 catches some of the stream and starts eddy currents, but these are damped out or dissipated within the space 178. By having the conical tip of the bushing 176 spaced inwardly from the end of the tube 168, the lateral velocity of the stream does not strike this conical tip. The action of the sealng cup 172 in preventing leakage through the hole 173 in the wall of the duct, prevents flow in a direction which would disturb the reading. The opposite end of the bushing 176 is preferably formed with a conically tapered portion 179 opening into the bore 177. For calibrating the jet attachment, the bore 177 is preferably drilled or reamed to the appropriate size for calibrating purposes, although, if desired, the calibration may be effected in a bushing secured in the lower end of the tube 168.

The jet device is connected through the rubber tube 105 with the coupling member 104, which is threaded either into the inlet port 32 or the outlet port 33 of the meter, depending upon whether the static pressure to be measured is above or below atmospheric pressure. In either event, an air stream is forced or induced to pass through the meter at a velocity proportional to the pressure to be measured. The meter, in responding to the velocity of this air stream, gives a direct reading in terms of pressure on the scale 86 of the meter dial 82, such scale being preferably calibrated to give pressure readings in inches of water.

In Figure 17A I have illustrated a modified type of static pressure jet comprising a tube portion 181 extending parallel to the air stream and preferably having a stream lined end 181'. Formed in the cylindrical wall of such tube are a large number of small orifices 182, which have sufficient aggregate capacity to accommodate the necessary flow through the meter. These orifices only respond to the static pressure within the duct. The angularly bent tube portion 181 may be faced either against or with the air stream. Such jet attachment carries the same rubber sealing cup 172, and its stem portion may be provided with a calibrating bushing if desired.

In Figure 19, I have illustrated a jet attachment 183 for measuring the total pressure within a duct or pipe containing an air stream, such total pressure being the summation of the static pressure within the duct plus the velocity pressure of the stream. Such jet attachment comprises a tube 184 having its end curved at 185 to dispose the jet opening 186 substantially at right angles to the main portion of the tube. This end of the tube is inserted through an opening 187 in the duct wall 148, and the jet opening 186 is pointed in a direction counter to the direction of the air stream. Adjacent to the lower stem or coupling portion 188 of the tube, a guide fin 189 projects laterally from the tube in the direction of and parallel to the curved upper end 185. This guide fin serves to indicate that the jet opening 186 is properly in line with the air stream and facing into the air stream. Inscribed on the tube 184 are graduations 191 which are numbered to denote the length of the tube in inches from the approximate center of the jet opening 186. As previously described in connection with Figure 16, these markings serve to indicate the exact point in the duct at which the velocity measurement is being taken. Calibration may be effected by properly proportioning the bore of the tube, or a calibrating bushing 192 may be secured within the lower end of the stem portion 188. The flexible tube 105 is extended from this jet to a coupling member 104 threading into the inlet port 32 of the meter. The pressures measured by this jet attachment can also be read on the scale 86 of the meter dial 82.

Figure 20:
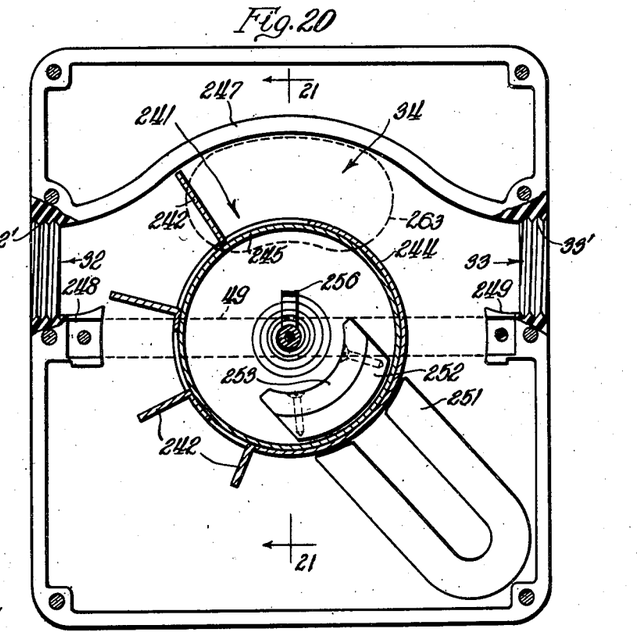
Figure 20 is a view similar to Figure 1, showing a modified construction of meter.
Figure 21:
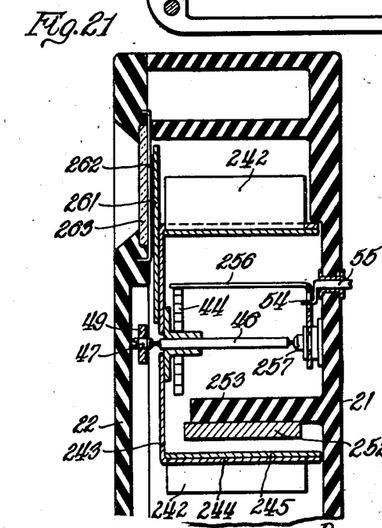
Figure 21 is a vertical sectional view taken approximately on the plane of the line 21—21 of Figure 20.

In Figures 20 and 21, I have illustrated a modified construction of meter wherein the movable member comprises a rotor 241 having a plurality of vanes 242 which move successively through the air channel 34. This air channel 34 is open at one side and is also open at both of its ends to the chambered interior of the meter housing, thereby forming an arcuate raceway for the rotor vanes, the latter being arranged to travel through the chamber and through said raceway. The inlet and outlet ports 32 and 33 open substantially tangentially to said raceway, and are arranged substantially in alignment with each other. The rotor is in the form of a cup comprising a web portion 243 and a rim portion 244. In the preferred construction, the vanes 242 are formed by slitting the rim portion 244 transversely and circumferentially to form tongues of metal which are then bent outwardly to form the vanes. While this is the preferred method of providing the rotor with vanes, I wish it to be understood that the vanes may also be made of separate stampings which can be secured to the rim portion 244 by soldering, riveting or in any other manner. Where the vanes are punched out of the body of the rim 244, the openings left in said rim are closed by inserting a thin liner sleeve 245 within the rim 244. The vanes may all be of the same radial length if desired, but I preferably make them progressively shorter in length so that they successively intercept smaller areas of the passageway 34 as the rotor revolves towards its position of maximum deflection, such arrangement providing for a more satisfactory spacing of the scale markings on the dial. The angular spacing between the vanes is preferably substantially uniform, as shown, although they may be arranged in other relations, if desired.

The air passageway 34 is curved upwardly in arcuate formation between the inlet and outlet ports 32 and 33, to provide an arcuate channel through which the vanes travel. The upper surface of said passageway is defined by the top wall 247, and the lower surface is defined by the rim portion 244 of the rotor and by the lower wall portions 248 and 249 extending inwardly from the inlet and outlet ports. The motion of the rotor is magnetically damped by a permanent magnet 251 which is stationarily mounted in the lower portion of the housing and which has its pole extremities in close proximity to the outer surface of the rim portion 244. The magnetic circuit is completed through said rim by an arcuate metallic bar 252 which is secured to a supporting segment 253 projecting forwardly from the back wall of the housing.

Referring to Figure 21, the inner end of the hair spring 44 is suitably secured to the rotor spindle 46, and the outer end of said hair spring is secured to an L-shaped clip 256. The inner leg of this clip is rotatably mounted on the bearing 257 which supports the rear end of the spindle 46, and a slot formed in this leg receives the pin 54 which extends in offset relation from the zero adjusting stud 55, the latter being rotatably mounted in the back wall of the housing. Rotation of this stud from the exterior of the housing serves to adjust the zero position of the indicating means, substantially as described of the preceding embodiment. The front spindle bearing 47 may be mounted in the cover 22, but is preferably mounted in the supporting bar 49 which has its ends secured to the main housing portion 21.

The indicating means may comprise a movable pointer and a stationary dial, as shown in Figures 1 and 2, or a stationary pointer and a movable dial. In Figure 21 I have illustrated the latter arrangement, the dial consisting of a suitable arcuate or circular plate 261 which is secured to the front wall of the cup-shaped rotor 241, and which extends across or covers the open front side of the arcuate raceway 34. The pointer 262 may consist of a hair line drawn on the back of the sight window 263 or it may consist of a fine wire disposed directly behind said sight window. The window opening is indicated in dotted outline in Figure 20.

Figure 22:
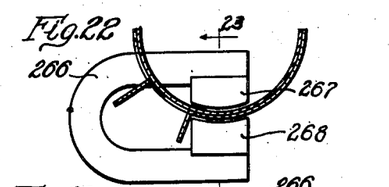
Figure 22 is a fragmentary sectional view of a modified form of magnetic damping means.
Figure 23:
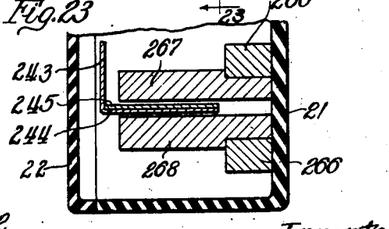
Figure 23 is a sectional view taken on the plane of the line 23—23 of Figure 22.

In Figures 22 and 23 I have illustrated a modified arrangement of magnetic damping means for damping the motion of the rotor. In this construction, the permanent magnet 266 is suitably secured to the back wall of the main housing section, behind the rear edge of the rotor. Secured to the pole extremities of the magnet are magnetic pole pieces 267, 268 which project toward the front of the housing, the pole piece 267 lying inside of the rotor rim 244 and the pole piece 268 lying outside thereof. This arrangement of the damping magnet and its poles permits the rotor to revolve through a greater angle than is possible in the construction shown in Figure 20; i. e., using a four vane rotor of the type shown in Figure 20, the construction shown in Figure 22 can have a rotative movement in excess of 200 degrees.

Figure 24:
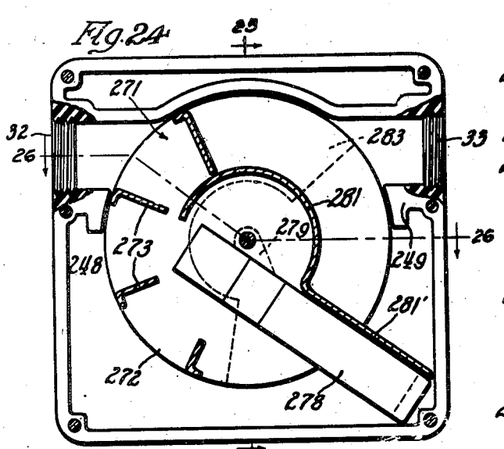
Figure 24 is a view similar to Figure 1 on a slightly smaller scale, showing another modified construction of meter.
Figure 25:
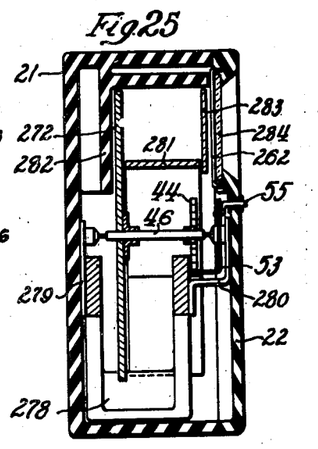
Figures 25 and 26 are vertical and horizontal sectional views taken approximately on the planes of the lines 25—25 and 26—26 of Figure 24.
Figure 26:
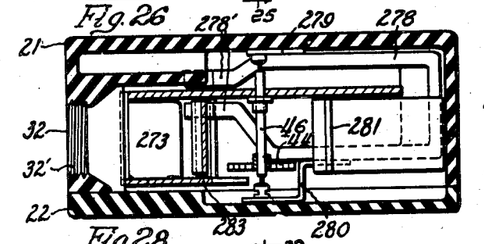
Figure 27:
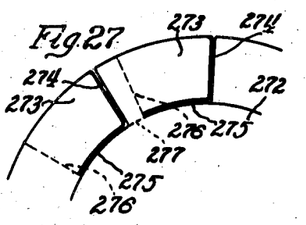
Figure 27 is a fragmentary elevational view showing one method of forming the rotor vanes.

Figures 24 and 27 inclusive illustrate another modified embodiment of meter employing a rotor as the velocity responsive member. In this construction, the rotor 271 comprises a disc 272 having the vanes 273 projecting laterally therefrom. The vanes may consist of separate stampings secured to the disc, or they may be punched out of the body of the disc as shown in Figure 27. In such operation, the original blank is slotted substantially radially at a plurality of points, as indicated at 274, and is also slotted tangentially as indicated at 275. The tongue of metal 273 defined between these slots is then bent laterally along the line 276, and the resulting L-shaped formation is then bent downwardly along the line 277 to form the inwardly extending vane. The vanes may all be made of the same size, or they may be trimmed so that they progressively diminish in radial dimension, as shown in Figure 24. Also, their angular spacing is preferably substantially uniform, but may be arranged in any other desired relation. The portion of metal in the original blank in which no vanes are formed is cut away so that the rotor has a substantially smooth circular periphery. The damping magnet 278 is disposed so as to embrace the disc 272, having its pole extremities 278' converging into close proximity to the opposite sides of the disc to form a narrow gap for the flux to pass through the disc, as illustrated in Figure 26. The magnet is suitably secured in the housing, and has spaced bearing brackets 279 and 280 secured thereto, these brackets supporting suitable bearings in which the opposite ends of the spindle 46 are journaled. Thus, the permanent magnet and the meter movement may be removed from the housing as a unit. The bottom wall of the air channel 34 is defined in part by a curved sheet metal baffle 281 having a lower straight portion 281' extending to the side wall of the housing above the magnet 278, such lower straight portion being secured to the magnet. The back wall of the air passageway is defined by a partition 282 formed integral with the main housing portion and disposed in proximity to the disc 272. Where the construction employs a movable dial, the latter preferably comprises an arcuate plate 283 which may be soldered or otherwise secured directly to the body of the disc 272 or to the forward edges of the vanes 273, the latter construction being shown. The scales on said movable dial are read through a sight window 284, in conjunction with an indicating line or pointer on said window, as previously described in connection with Figure 21. The hair spring 44 has its outer end connected to an arm 53 which can be angularly adjusted about the axis of the spindle 46 through the instrumentality of the zero adjusting stud 55, in the same manner previously described in the embodiment shown in Figures 1, 2, and 3.

Figures 27, 29:
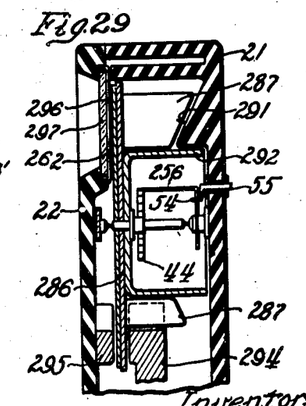
Figure 29 is a sectional view taken on the plane of the line 29—29 of Figure 28.
Figure 28:
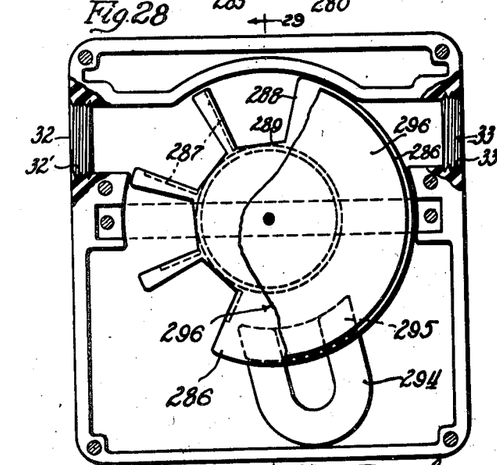
Figure 28 is a view similar to Figure 24, showing still another modified construction of meter.

Figures 28 and 29 illustrate another modified construction employing a disc type of rotor 286. In this construction, the vanes 287 are formed by punching segmental tongues and bending them laterally from the body of the disc. Each tongue is formed by slotting the disc along the approximately radial line 288 and along the substantially tangential or chord line 289, and bending the tongue of metal defined between these lines into the laterally projecting position of the vane. Where it is desired to have the vanes diminish in effective area, the outer edges are trimmed off to make the vanes of diminishing radial length. The radially extending free edges of the vanes may be trimmed to extend substantially parallel to the plane of the disc, or they may be left inclined as shown in Figure 29, in which case the rear wall of the air passageway 34 is correspondingly inclined, as indicated at 291. The lower surface of the air passageway 34 is defined in part by a light cup-shaped shell 292 which has its web portion secured to the body of the disc 286, and which has its rim portion substantially in contact with the inner edges of the vanes 287. The hair spring 44 is enclosed within the cup 292, and is adapted to be adjusted through an arrangement of zero adjusting parts substantially as illustrated in Figure 21. The enclosure of the hair spring within the cup 292 protects the hair spring from acid laden air. The permanent magnet 294 is disposed behind the disc 286 and has its magnetic circuit completed through the disc by an arcuate bar 295 of magnetic metal which is disposed in front of the disc, preferably being secured to the removable front cover 22. Where a movable dial is employed, it preferably consists of a plate or disc 296 which is secured to the front side of the disc 286. The scale markings on said dial are read through a sight window 297, in conjunction with an indicating line or pointer on said window, as previously described in connection with Figure 21.

In each of the constructions illustrated in Figures 20 to 29 inclusive, the rotor may have an appropriate balancing weight mounted thereon to compensate for any unbalance created by the vanes, which balancing weight may in some instances, consist merely of a few drops of solder. In each of these constructions, the inlet and outlet ports 32 and 33 are provided with threads 32' and 33' for receiving the orifice attachments, coupling connections and other devices previously described in connection with the construction of meter illustrated in Figures 1 to 4 inclusive. They may also be arranged to receive the filter attachment 194. Furthermore, such rotor types of meter may be provided with screens associated with said inlet and outlet ports, they may be provided with calibrating shutters 94, and they may be provided with locking apparatus for locking the rotor against motion during transport or for temporarily retaining a reading.

While I have illustrated and described what I regard to be the preferred embodiments of my invention, nevertheless it will be understood that such are merely exemplary, and numerous modifications and rearrangements may be made therein without departing from the essence of the invention.

I claim:

1. In a meter, the combination of a housing having an air passageway therein, a movable member comprising a plurality of angularly spaced vanes adapted to travel through said passageway, said vanes being successively of smaller size for successively intercepting smaller areas of said passageway, yieldable means yieldingly resisting motion of said movable member, and indicating means responsive to the motion of said movable member.

2. In an air velocity meter, the combination of a housing having inlet and outlet ports in opposite side walls thereof, an air passageway extending between said ports, a rotor having a plurality of vanes adapted to travel through said air passageway, said vanes being successively of smaller size for successively intercepting smaller areas of said passageway in the motion of said rotor, spring means yieldingly resisting rotation of said rotor, indicating means responsive to the motion of said rotor, and magnetic damping means for damping the motion of the rotor.

3. A meter comprising a housing having a chamber, said housing having a stationary arcuate wall therein which partly defines said chamber, said arcuate wall forming one side of an arcuate raceway which opens at its ends to the chamber, said housing also having oppositely disposed inlet and outlet ports opening to said raceway in a tangential direction and arranged in alignment with each other, a rotor rotatively mounted in said chamber of said housing, said rotor having a disc, a portion of the margin of said disc extending from said arcuate wall to the other side of said raceway, said rotor also having a plurality of circumferentially disposed vanes arranged to travel through said raceway, said vanes being carried by said margin of said disc, spiral spring means operatively connected to said rotor to resist movement thereof, an indicating dial carried by said rotor, and an air tube having branches connected to said housing at said inlet and outlet ports.

4. In a portable air velocity meter, the combination of a chambered housing having an arcuate raceway opening at both ends to the chamber and provided with oppositely disposed aligned inlet and outlet ports adjacent the ends thereof, a rotor rotatively mounted in the chamber of the housing and capable of rotating through at least one hundred and thirty degrees, said rotor having a plurality of circumferentially disposed vanes radiating at divergent angles and arranged to travel through the chamber and through the raceway between the inlet and outlet ports, yieldable means for yieldably resisting rotation of the rotor, and an indicating element mounted concentrically of said rotor and rotated directly thereby.

5. In a meter, the combination of a chambered housing having an arcuate raceway opening at its side and opening at both of its ends to the chamber, said housing having also oppositely disposed inlet and outlet ports opening tangentially to said raceway and arranged in alignment with each other, a rotor rotatably mounted in the chamber of the housing for rotation through at least one hundred and thirty degrees, and having a disc covering the open side of the raceway, said rotor having a plurality of circumferentially disposed vanes projecting laterally therefrom and arranged to travel through the chamber and through said raceway, an indicating dial carried by the rotor, a spiral spring stationarily mounted at one end and connected at its other end to the rotor, and an air tube having branches arranged for connection with the housing at the inlet and outlet ports.

6. In a meter, the combination of a chambered housing having an arcuate wall therein forming one side of an arcuate raceway, which opens at its ends to the chamber, said housing having also oppositely disposed inlet and outlet ports opening to said raceway in a tangential direction and arranged in alignment with each other, a disc-like rotor rotatably mounted in the chamber of the housing and extending over the raceway, said rotor having a plurality of circumferentially disposed vanes arranged to travel through said raceway, a spiral spring stationarily mounted at one end and connected at its other end to the rotor, an indicating dial carried by the rotor, and an air tube having a main tube and branches secured thereto and arranged for connection with the housing at the inlet and outlet ports.

7. In a meter, the combination of a chambered housing having an arcuate raceway therein, open at its upper side, and opening at its ends to the chamber, there being aligned air inlet and outlet ports in the housing opening to the raceway, a spring returned disc-like rotor having an arbor rotatively mounted in the chamber of the housing, asid disc-like rotor extending over the open side of the raceway and having a plurality of circumferentially disposed vanes arranged to travel through the chamber and through the raceway, a dial mounted on the rotor, and damping means for damping the motion of said rotor.

8. In a portable air velocity meter capable of being held in the hand and of being inclined at different operating angles during use, the combination of a casing, an air channel in said casing, inlet and outlet ports for said channel, said ports being located in opposite side walls of said casing, and said channel extending in a substantially straight line between said ports whereby the latter can be aligned with free atmospheric air currents and a substantially uni-directional air flow provided through the meter, a moving system comprising a plurality of successively disposed vanes movable in said air channel, said vanes being deflected by the air flow therethrough, means yieldingly opposing such motion of the moving system and operative to restore the latter to normal position after cessation of air flow, indicating means adapted to give direct readings in terms of air velocity from the deflection of said moving system, means for substantially balancing said moving system to maintain the accuracy of the meter when held at different angles, magnetic damping means equally effective in any position of the meter for damping said indicating means, internal coupling threads in each of said inlet and outlet ports, separate coupling members having external coupling threads adapted to screw into said internal threads to establish readily attachable and detachable connection with said inlet and outlet ports, each of said coupling members having a nipple extension, sections of rubber tubing engaging over said nipple extensions, and a duct jet for measuring velocities in a duct or the like, said duct jet comprising two tubes having their inner ends connected with said sections of rubber tubing and having oppositely facing openings in their outer ends, the flexibility of said sections of rubber tubing enabling the meter casing and duct jet to be turned or inclined one relatively to the other in making different velocity measurements under different conditions.

9. In a portable air velocity meter capable of being held in the hand and of being inclined at different operating angles during use, the combination of a casing, an air channel in said casing, inlet and outlet ports for said channel, said ports being located in opposite side walls of said casing and said channel extending in a substantially straight line between said ports whereby the latter can be aligned with free atmospheric air currents and a substantially uni-directional air flow provided through the meter, a moving system comprising a vane movable in said air channel for deflection by the air flow therethrough, means yieldingly opposing such motion of the moving system and operative to restore the latter to normal position after cessation of air flow, indicating means adapted to give direct readings in terms of air velocity from the deflection of said moving system, means for substantially balancing said moving system to maintain the accuracy of the meter when held at different angles, magnetic damping means equally effective in any position of the meter for damping said indicating means, an internal coupling thread in said inlet port, a coupling member having an external coupling thread adapted to screw into said internal thread to establish readily attachable and detachable connection with said inlet port, said coupling member having a nipple extension, a section of rubber tubing engaging over said nipple extension, a jet device adapted to be connected with the other end of said section of rubber tubing and adapted for introduction into a closed duct or other region of air flow relatively remote from the meter casing so that velocity measurements can be taken at points relatively inaccessible to said casing and so that inaccuracies arising from the turbulence created by disposing the casing in the air stream are avoided, the flexibility of said section of rubber tubing enabling the meter casing and the jet device to be turned or inclined one relatively to the other in making different velocity measurements under different operating conditions, and a calibrating orifice in said jet device individually calibrated relatively thereto, whereby a plurality of jet devices each having a calibrating orifice may be associated with a particular meter, said jet devices being collectively calibrated by the orifices with respect to a desired scale range on the indicating means of that meter.

10. In a portable air velocity meter capable of being held in the hand and of being inclined at different operating angles during use, the combination of a casing, an air channel in said casing, inlet and outlet ports for said channel, said ports being located in opposite side walls of said casing and said channel extending in a substantially straight line between said ports whereby the latter can be aligned with free atmospheric air currents and a substantially uni-directional air flow provided through the meter, a moving system comprising a vane movable in said air channel for deflection by the air flow therethrough, means yieldingly opposing such motion of the moving system and operative to restore the latter to normal position after cessation of air flow, indicating means adapted to give direct readings in terms of air velocity from the deflection of said moving system, an internal coupling thread in said inlet port, a coupling member having an external coupling thread adapted to screw into said internal thread to establish a readily attachable and detachable connection with said inlet port, said coupling member having a nipple extension, a section of rubber tubing engaging over said nipple extension, a jet device adapted to be connected with the other end of said section of rubber tubing and adapted for introduction into a closed duct or other region of air flow relatively remote from the meter casing so that velocity measurements can be taken at points relatively inaccessible to said casing and so that inaccuracies arising from the turbulence created by disposing the casing in the air stream are avoided, and a calibrating orifice in said jet device individually calibrated relatively thereto whereby a plurality of jet devices each having a calibrated orifice may be associated with a particular meter, said jet devices being collectively calibrated by the orifices with respect to the required scale range on the indicating means of that meter.

11. In a portable air velocity meter capable of being held in the hand and of being inclined at different operating angles during use, the combination of a casing, an air channel in said casing, inlet and outlet ports for said channel, said ports being located in opposite side walls of said casing and said channel extending in a substantially straight line between said ports whereby the latter can be aligned with free atmospheric air currents and a substantially uni-directional air flow provided through the meter, a moving system comprising a vane movable in said air channel for deflection by the air flow therethrough, means yieldingly opposing such motion of the moving system and operative to restore the latter to normal position after cessation of air flow, indicating means adapted to give direct readings in terms of air velocity from the deflection of said moving system, coupling members adapted to establish readily attachable and detachable connection with said inlet and outlet ports, sections of flexible tubing engaging with said coupling members, and a duct jet for measuring velocities in a duct or the like, this duct jet including a stem portion of substantially uniform cross section throughout its length for movement through a relatively small aperture in the wall of the duct, said stem portion comprising two tubes having their inner ends connected with said sections of flexible tubing and having oppositely facing openings in their outer ends, each of said oppositely facing openings being of relatively large size approximating the effective area of its associated tube, curved deflecting surfaces in said tubes adjacent to said oppositely facing openings for guiding the air stream therethrough, and markings on said duct jet for indicating the distance that said stem portion is inserted into the duct, the flexibility of said sections of flexible tubing enabling the meter casing and duct jet to be turned or inclined one relatively to the other in making different velocity measurements under different conditions.

12. In a portable air velocity meter capable of being held in the hand and of being inclined at different operating angles during use, the combination of a casing, an air channel in said casing, inlet and outlet ports for said channel, said ports being located in opposite side walls of said casing and said channel extending in a substantially straight line between said ports whereby the latter can be aligned with free atmospheric air currents and a substantially uni-directional air flow provided through the meter, a moving system comprising a vane movable in said air channel for deflection by the air flow therethrough, means yieldingly opposing such motion of the moving system and operative to restore the latter to normal position after cessation of air flow, indicating means adapted to give readings in terms of air velocity from the deflection of said moving system, means for substantially balancing said moving system to maintain the accuracy of the meter when held at different angles, damping means equally effective in any position of the meter for damping said indicating means, two sections of flexible tubing, adapted to have readily attachable and detachable connection with said inlet and outlet ports, a duct jet device for measuring velocities in a duct or the like, said duct jet device comprising two tubes having their inner ends connected with said sections of flexible tubing and having oppositely facing openings in their outer ends, the flexibility of said sections of tubing enabling the meter casing and duct jet device to be turned or inclined one relatively to the other in making different velocity measurements under different conditions, a calibrating orifice in said jet device for individually calibrating said jet device with respect to a desired scale range of said indicating means, and means for preventing free atmospheric air currents in which the casing may be situated from passing through said air channel when said sections of flexible tubing are placed in communication with the ports, whereby a plurality of similar jet devices each having a calibrating orifice may be connected to said tubing sections, said jet devices being calibrated by said orifices with respect to a desired range of said indicating means.

13. In a portable air velocity meter capable of being held in the hand and of being inclined at different operating angles during use, the combination of a casing, an air channel in said casing, inlet and outlet ports for said channel, said ports being located in opposite side walls of said casing and said channel extending in a substantially straight line between said ports whereby the latter can be aligned with free atmospheric air currents and a substantially uni-directional air flow provided through the meter, a moving system comprising a vane movable in said air channel for deflection by the air flow therethrough, means yieldingly opposing such motion of the moving system and operative to restore the latter to normal position after cessation of air flow, indicating means responsive to the motion of said moving system, a section of flexible tubing, coupling means for establishing readily attachable and detachable connection between one end of said section of tubing and one of said ports, a jet device adapted to be connected with the other end of said section of flexible tubing and adapted for introduction into a closed duct or other region of air flow relatively remote from the meter casing, said coupling means preventing free atmospheric air currents in which the casing may be situated from passing through said air channel when said section of flexible tubing is placed in communication with the port, the flexibility of said section of tubing enabling the meter casing and the selected jet to be turned or inclined one relatively to the other in making different velocity measurements under different operating conditions, and a calibrating orifice in said jet device individually calibrated relatively thereto whereby a plurality of jet devices each having a calibrated orifice may be associated with a particular meter, said jet devices being collectively calibrated by the orifices with respect to a desired scale range on the indicating means of that meter.

14. In a portable meter of the class described capable of being held in the hand and of being inclined at different operating angles during use, the combination of a casing, an air channel in said casing, inlet and outlet ports for said channel, a moving system comprising a vane movable in said air channel for deflection by the air flow therethrough, means yieldingly opposing such motion of the moving system and operative to restore the latter to normal position after cessation of air flow, indicating means for indicating the deflection of said moving system, means for substantially balancing said moving system to maintain the accuracy of the meter when held at different angles, damping means equally effective in any position of the meter for damping said indicating means, a jet device of rigid structure for establishing communication with velocity or pressure regions relatively remote from the meter casing, a flexible tube connected with said jet device and with one of said ports in the meter casing, the flexibility of said tube enabling the meter casing and the selected jet device to be turned or inclined one relatively to the other in making different velocity measurements under different operating conditions, and a calibrating orifice embodied in said jet device and individually calibrated with respect to said jet device whereby a plurality of jet devices each having a calibrated orifice may be associated with a particular meter, said jet devices being selectively calibrated by the orifices with respect to a desired scale range on the indicating means of said meter.

15. In a portable meter of the class described capable of being held in the hand and of being inclined at different operating angles during use, the combination of a casing, an air channel in said casing, inlet and outlet ports for said channel, a moving system comprising a vane movable in said air channel for deflection by the air flow therethrough, means yieldingly opposing such motion of the moving system and operative to restore the latter to normal position after cessation of air flow, indicating means for indicating the deflection of said moving system, a jet device for establishing communication with velocity or pressure regions relatively remote from the meter casing, a flexible tube connected at one end with said jet device and at the other end with one of the ports in the meter casing, and a calibrating orifice in said jet device individually calibrated relatively thereto whereby a plurality of jet devices each having a calibrated orifice may be associated with a particular meter, said jet devices being collectively calibrated by the orifices with respect to a desired scale range on the indicating means of that meter, the flexibility of said tube enabling the meter casing and the jet device to be turned or inclined one relatively to the other in making different velocity measurements under different operating conditions.

16. In a portable meter of the class described capable of being held in the hand and of being inclined at different operating angles during use, the combination of a casing, an air channel in said casing, inlet and outlet ports for said channel, a moving system comprising a vane movable in said air channel for deflection by the air flow therethrough, means yieldingly opposing such motion of the moving system and operative to restore the latter to normal position after cessation of air flow, indicating means for indicating the deflection of said moving system, and extension conduit connecting with said inlet port, a jet device connected with said extension conduit, and a calibrating orifice disposed in said jet device, separate from said meter casing, for calibrating the air flowing through said extension conduit to the inlet port of said meter, said orifice serving to individually calibrate said jet device with respect to the desired scale range of said indicating means.

17. In a portable meter of the class described capable of being held in the hand and of being inclined at different operating angles during use, the combination of a casing, an air channel in said casing, inlet and outlet ports for said channel, a moving system comprising a vane movable in said air channel for deflection by the air flow therethrough, means yieldingly opposing such motion of the moving system and operative to restore the latter to normal position after cessation of air flow, indicating means for indicating the deflection of said moving system, a jet device, a coupling member for coupling said jet device to the meter in communication with said inlet port, and a calibrating orifice in said coupling member for calibrating said jet device with respect to the desired scale range of said indicating means.

JOHN R. BOYLE.